US012669645B2

(12) United States Patent
Figeys

(10) Patent No.: US 12,669,645 B2
(45) Date of Patent: Jun. 30, 2026

(54) ARRAYED WAVEGUIDE MULTIPLEXING/DEMULTIPLEXING DEVICE WITH PHASE CORRECTION

(71) Applicant: IMEC VZW, Leuven (BE)

(72) Inventor: Bruno Figeys, Heverlee (BE)

(73) Assignee: Imec vzw, Leuven (BE)

( * ) Notice: Subject to any disclaimer, the term of this patent is extended or adjusted under 35 U.S.C. 154(b) by 417 days.

(21) Appl. No.: 18/392,389

(22) Filed: Dec. 21, 2023

(65) Prior Publication Data

US 2024/0210618 A1      Jun. 27, 2024

(30) Foreign Application Priority Data

Dec. 23, 2022     (EP) .................................... 22216376

(51) Int. Cl.
  *G02B 6/12*          (2006.01)
  *G01J 3/02*          (2006.01)
(52) U.S. Cl.
  CPC ..... *G02B 6/12014* (2013.01); *G02B 6/12021* (2013.01); *G01J 3/0208* (2013.01); *G01J 3/021* (2013.01); *G02B 2006/12104* (2013.01); *G02B 2006/12164* (2013.01)
(58) Field of Classification Search
  None
  See application file for complete search history.

(56) References Cited

U.S. PATENT DOCUMENTS

| | | | | |
|---|---|---|---|---|
| 5,450,511 A | * | 9/1995 | Dragone | G02B 6/12011 |
| | | | | 385/47 |
| 5,457,760 A | * | 10/1995 | Mizrahi | H04J 14/0307 |
| | | | | 398/79 |
| 6,571,031 B1 | * | 5/2003 | Augustsson | G02B 6/34 |
| | | | | 385/47 |

(Continued)

FOREIGN PATENT DOCUMENTS

JP          2002072157 A        3/2002

OTHER PUBLICATIONS

Extended European Search Report and Written Opinion, Application No. EP 22216376.8, mailed Jun. 6, 2023, 5 pages.
Gargallo, Bernardo, Pascual Munoz, Rocío Baños, Anna Lena Giesecke, Jens Bolten, Thorsten Wahlbrink, and Herbert Kleinjans. "Reflective arrayed waveguide gratings based on Sagnac loop reflectors with custom spectral response." Optics Express 22, No. 12 (2014): 14348-14362.

(Continued)

*Primary Examiner* — Jerry Rahll
(74) *Attorney, Agent, or Firm* — McDonnell Boehnen Hulbert & Berghoff LLP

(57)          ABSTRACT

An integrated photonics arrayed waveguide multiplexing/demultiplexing device is disclosed. The device includes an array of waveguides having an incident light waveguide section including a phase correcting region, a transmitted light waveguide section, a tunable reflector, wherein each pair of consecutive waveguides in the array includes a coupler. The coupler configured to combine light from the transmitted light waveguide sections, determine therefrom an optical phase difference between the two consecutive waveguides, and wherein the couplers are further configured to determine therefrom a change in optical path length required for each of two consecutive waveguides to reach a (Continued)

predetermined optical phase difference, and wherein each phase correcting region is configured to apply the change to correct the optical path length of the respective waveguide.

18 Claims, 6 Drawing Sheets

(56) References Cited

U.S. PATENT DOCUMENTS

2003/0228091 A1 * 12/2003 Lee ..................... G02B 6/12019
                                            385/18
2016/0306112 A1 * 10/2016 Muñoz Muñoz .. G02B 6/12011

OTHER PUBLICATIONS

Fernandez, Juan, Joan Felip, Bernardo Gargallo, David Domenech, Carlos Dominguez, and Pascual Muñoz. "Reconfigurable reflective arrayed waveguide grating (R-RAWG)." In Integrated Optics: Devices, Materials, and Technologies XXV, vol. 11689, pp. 42-55. SPIE, 2021.
Pathak, Shibnath, Michael Vanslembrouck, Pieter Dumon, Dries Van Thourhout, and Wim Bogaerts. "Optimized silicon AWG with flattened spectral response using an MMI aperture." Journal of Lightwave Technology 31, No. 1 (2013): 87-93.

* cited by examiner

ARRAYED WAVEGUIDE MULTIPLEXING/DEMULTIPLEXING DEVICE WITH PHASE CORRECTION

CROSS-REFERENCE TO RELATED APPLICATIONS

The present application is a non-provisional patent application claiming priority to European Patent Application No. EP 22216376.8, filed Dec. 23, 2022, the contents of which are hereby incorporated by reference.

FIELD OF THE DISCLOSURE

The present invention generally relates, amongst others, to the field of integrated photonics. More particularly, it relates to integrated photonic structures for optical multiplexing/demultiplexing and to methods of manufacturing thereof.

BACKGROUND

Mass-scale microfabricated optical waveguides are being considered for various applications such as for example spectroscopy, sensing, telecommunications, and optical beamforming. Most of these applications typically rely on the manufacturing of for example optical phased arrays, planar lenses, multiplexers and/or demultiplexers, in the form of for example arrayed waveguide gratings, echelle gratings, cascaded Mach-Zehnder interferometers, ring resonators, etc. Depending on the specific application requirements, these optical integrated circuits can become rather large.

Arrayed waveguide gratings, also referred to as AWGs, are commonly used as optical multiplexers/demultiplexers in wavelength division multiplexed systems. These devices can for example multiplex many wavelengths into a single optical fiber, thereby increasing the transmission capacity of optical networks considerably. Arrayed waveguide gratings are based on a fundamental principle of optics that light waves of different wavelengths do not interfere linearly with each other. In other words, if each channel in an optical communication network makes use of light of a slightly different wavelength, then the light from many of these channels can be carried by a single optical fiber with negligible crosstalk between the channels. Arrayed waveguide gratings are used to multiplex channels of several wavelengths onto a single optical fiber at the transmission end and are also used as demultiplexers to retrieve individual channels of different wavelengths at the receiving end of an optical communication network.

Phase errors in arrayed waveguide gratings are caused by either for example geometrical deformations and/or variations of the waveguide shape or by for example variation of the optical properties of the waveguide material, e.g., material composition variations.

Waveguide geometry variations can be caused for example by variations in lithography exposure and/or etching processes and/or deposition processes across a die and/or by short range variations in the form of roughness. Waveguide roughness, such as for example roughness of the sidewalls of a waveguide, is a problem which remains especially hard to correct.

The phase errors in arrayed waveguide gratings lead to sub-optimal performance of the arrayed waveguide gratings. For example, the phase errors result in increased insertion loss, and/or increased crosstalk between the different bands or channels of the arrayed waveguide gratings.

SUMMARY

The present disclosure related to an integrated photonics arrayed waveguide multiplexing/demultiplexing device and a related method which do not show the inherent shortcomings of the prior art. More specifically, the present disclosure provides an integrated photonics arrayed waveguide multiplexing/demultiplexing device and a related method for correcting differences in optical path length resulting for example phase errors.

There is a need for an integrated photonics arrayed waveguide multiplexing/demultiplexing device in which phase errors between each subsequent waveguide of the integrated photonics arrayed waveguide multiplexing/demultiplexing device may be corrected.

An embodiment provides a method for correcting differences in optical path length between consecutive waveguides in an integrated photonics arrayed waveguide multiplexing/demultiplexing device.

The disclosed method for correcting differences in optical path length between consecutive waveguides is implemented by an integrated photonics arrayed waveguide multiplexing/demultiplexing device comprising:

a free propagation region comprising a first section and a second section;

a first waveguide coupled to the first section;

a plurality of output waveguides coupled to the first section;

an array of waveguides with increasing lengths between consecutive waveguides throughout the array and coupled to the second section, wherein each waveguide comprises:

an incident light waveguide section comprising a phase correcting region;

a transmitted light waveguide section;

a tunable reflector between the incident light waveguide section and the transmitted light waveguide section; wherein the tunable reflector is configured to act as a semi-transparent reflector for light propagating between the incident light waveguide section and the transmitted light waveguide section, thereby generating reflected light;

wherein the output waveguides are configured to collect the reflected light at least partially;

wherein each pair of consecutive waveguides in the array comprises a coupler configured to:

combine light propagating in the transmitted light waveguide sections of the two consecutive waveguides;

determine therefrom an optical phase difference between the two consecutive waveguides; and wherein the couplers are further configured to determine therefrom a change in optical path length required for each of two consecutive waveguides in the array to reach a predetermined optical phase difference between the two consecutive waveguides;

and wherein each phase correcting region is configured to apply the change to correct the optical path length of the respective waveguide.

Some integrated photonics components, such as for example arrayed waveguide gratings or integrated lenses, require on-chip optical path lengths that are of varying size. Typically, the design such components blows up in size since it is difficult to realize such path length difference in a compact way. One way to make such components more compact is to fold the components in at least two by using for example reflectors. This way, for an arrayed waveguide grating for example, a standard star coupler region may be used and may be coupled to a waveguide array with half the required wavelength length for each waveguide of the waveguide array by terminating each of the waveguides of the waveguide array with a reflector, such as for example a Bragg reflector, a metal reflector, a loop-reflector, etc.

With the integrated photonics arrayed waveguide multiplexing/demultiplexing device according to the present disclosure, a tunable reflector is formed in each waveguide of the waveguide array. Each tunable reflector is for example a semi-transparent reflector which acts as a semi-transparent reflector for light propagating between the incident light waveguide section and the transmitted light waveguide section, thereby generating reflected light. The reflected light propagates back towards the free propagation region and the reflected light couples at least partially back to one or more of the output waveguides coupled to the first section of the free propagation region. With the integrated photonics arrayed waveguide multiplexing/demultiplexing device according to the present disclosure, the fraction of the light which is transmitted to the transmitted light waveguide section of a waveguide through the tunable reflector can be used to evaluate the magnitude of the phase errors between each subsequent waveguide of the array of waveguides. In other words, an amplitude of the phase errors between two consecutive waveguides of the array of waveguides can be determined from light which is transmitted to the transmitted light waveguide sections of the two consecutive waveguides through the respective tunable reflectors. This is realized according to the present disclosure by interfering substantially half of the power of the light transmitted to the transmitted light waveguide section of a first waveguide of the array of waveguides with half of the power of the light transmitted to the transmitted light waveguide section of a waveguide neighboring the first waveguide in the array of waveguides.

With the integrated photonics arrayed waveguide multiplexing/demultiplexing device according to the present disclosure, knowing the actual phase errors between the waveguides of the array of waveguides allows correcting the phase errors with the phase correcting region. For example, the correction of the phase errors can happen either actively with for example phase shifters, or permanently by changing one or more geometrical and design aspects of the waveguide array.

In the context of the present disclosure, a free propagation region is for example a star coupler of an arrayed waveguide grating. Alternatively, the free propagation region is for example a slab waveguide.

In the context of the present disclosure, a tunable reflector is configured to demonstrate a tunable reflectivity. In other words, the reflectivity of each tunable reflector of the integrated photonics arrayed waveguide multiplexing/demultiplexing device can be modified. Alternatively, the reflectivity of more than one tunable reflectors of the integrated photonics arrayed waveguide multiplexing/demultiplexing device can be modified simultaneously. In the context of the present disclosure, a tunable reflector comprises for example one or more of the following: a Bragg reflector, a metal reflector, a loop-reflector, etc. Most of the light, e.g. 90%, should be targeted to be reflected by the tunable reflector to the free propagation region. The part of the light that is transmitted through the tunable reflector is guided further into the transmitted light waveguide section of the corresponding waveguide. In other words, a in the context of the present disclosure, a tunable reflector is for example switchable. The tunable reflector has for example a variable reflection/transmission behavior in time. For example, during calibration of the integrated photonics arrayed waveguide multiplexing/demultiplexing device, the reflection could be reduced, while the tunable reflector could be made 100% reflective after calibration.

In the context of the present disclosure, an optical phase difference between the two consecutive waveguides corresponds to the difference in phase angle of the two light waves propagating respectively in each of the two consecutive waveguides. In the context of the present disclosure, a difference in optical path length between two consecutive waveguides corresponds to the difference in the path traversed by the two light waves propagating respectively in each of the two consecutive waveguides. There exists a direct relation (1) between the optical phase difference and the difference in optical path length:

$$\Delta L = 2\pi \cdot \lambda \cdot \Delta\phi \qquad (1)$$

wherein $\Delta L$ is the difference in optical path length and wherein $\Delta\phi$ is the optical phase difference. In other words, a difference in optical path length is the difference in path traversed by the two waves, measured in terms of wavelength of the associated wave. In the context of the present disclosure, an optical phase difference is for example related to the nature of an interference pattern. Referring to equation (1) above, if a difference in optical path length between two waves is an integral multiple of the wavelength, this satisfies condition for constructive interference. Whereas, if a difference in optical path length between two waves is an odd multiple of half the wavelength, this satisfies condition for destructive interference. In other words, an optical path difference corresponds to a relative path length difference, or phase shift, travelled between two waves that pass through different mediums from the same object point. For a perfect optical system, the optical path, or distance, from an object point to a corresponding image point will be equal for all waves. In near-perfect systems, slight differences will exist between waves resulting in an optical path difference, usually expressed in fractions of the wavelength being analysed. When waves pass through an optical system, the optical path difference between the wavefronts of "real" and paraxial waves attribute to for example optical aberrations. In other words, the expression optical path length in the context of the present disclosure refers to the path length that the light wave travels in time, determined by the optical path length of the central ray of the wavefront; therefore, it is directly dependent on the speed of light through optical media and may differ from the geometric path length. An error on and/or in the optical media therefore results in different optical path lengths—and error magnitude. In other words, in the context of the present disclosure, optical path length, also referred to as optical length or optical distance, is the product of the geometric length of the optical path followed by light and the refractive index of homogeneous medium through which a light ray propagates; for inhomogeneous optical media, the product above is generalized as a path integral as part of the ray tracing procedure. A difference in optical path length between two paths is often called the optical path difference. Optical path length and optical path difference are important as they determine the phase of the light and governs interference and diffraction of light as it propagates. In other words, a difference in optical path length corresponds to the phase shift undergone by the light emitted from two previously coherent sources when passed through mediums of different refractive indices. The difference in optical path length can be calculated from the following equation (2):

$$\Delta L = d_1 n_1 - d_2 n_2 \qquad (2)$$

wherein $d_1$ and $d_2$ are the distances of the ray passing through medium 1 or 2, $n_1$ and $n_2$ are refractive indexes.

In the context of the present disclosure, according to the target specification for channel spacing and bandwidth for the integrated photonics arrayed waveguide multiplexing/demultiplexing device, the required path length difference $\Delta L$ and size of the star coupler is known. In other words, a predetermined optical phase difference between two consecutive waveguides in the array of waveguides is known beforehand, and depends for example on the technology stack, i.e., the waveguide materials and/or dimensions of the waveguides.

In the context of the present disclosure, the design of the first section of the free propagation region, coupled to a first waveguide and a plurality of output waveguides, and thereby corresponding to an input aperture into the free propagation region, as well as the design of the second section of the free propagation region, coupled to the array of waveguides, and thereby corresponding to output apertures from the free propagation region, would be according to well-documented state-of-the art design rules. For example, the input and/or output apertures may comprise one or more tapers, or one or more multimode apertures as described in Pathak et al., in the scientific publication entitled "Optimized silicon AWG with flattened spectral response using an MMI aperture", IEEE J. Lightw. Technol., 31, 87-93, 2013. In the context of the present disclosure, the design of the free propagation region should comply with state-of-the art design rules.

In the context of the present disclosure, each of the waveguides of the array of waveguides comprises a phase correcting region, or in other words, a variable phase section. The phase correcting region is a part of the waveguide of which the optical path length can be varied. For example, a phase correcting region according to the present disclosure can comprise one or more of the following: a capacitive phase shifter, a heater, a waveguide section with a memory element, e.g., by annealing of an amorphous/poly-crystalline material, an ferroelectric material, e.g., BTO, a section of the waveguide that can be implanted with ions, e.g., dopants, or that can be trimmed with e-beam/ion beam milling, etc.

In the context of the present disclosure, the correction of the optical path length of the respective waveguide could happen when the chip/wafer onto which the integrated photonics arrayed waveguide multiplexing/demultiplexing device is manufactured is fully fabricated. Alternatively, the correction of the optical path length of the respective waveguide could be performed somewhere during the fabrication process of the integrated photonics arrayed waveguide multiplexing/demultiplexing device, for example before covering the waveguides of the array of waveguides with a dielectric and/or with oxide. Once the phase difference between each waveguide in the array of waveguides is evaluated, the different path lengths can be corrected to obtain the one expected by design, i.e. to reach the predetermined optical phase difference between two consecutive waveguides in the array of waveguides.

In the context of the present disclosure, the optical path length for the light to return to the free propagation region will be the same as the optical path light for arriving to the tunable reflector if the same waveguide mode is used, such as for example typically the fundamental mode, and if no non-reciprocal materials, such as for example YIG, or time-varying fields are used/applied.

In the context of the present disclosure, a calibration procedure could consist in evaluating the current phase differences between each consecutive waveguides in the array of waveguides, and to calculate what the optical path length changes required to each waveguide are to get a phase error free waveguide array for the integrated photonics arrayed waveguide multiplexing/demultiplexing device. In some examples, the center wavelength may preferably be used for this calibration to minimize dispersive effects.

According to example embodiments, each of the transmitted light waveguide sections further comprises a power splitter configured to split the respective transmitted light waveguide section into two separate waveguides, a first separate waveguide and a second separate waveguide.

According to example embodiments, each coupler comprises a power combiner configured to combine light propagating in a first separate waveguide of one waveguide of a pair of consecutive waveguides in the array with light propagating in a second separate waveguide of the other waveguide of the pair of consecutive waveguides in the array.

The light that is transmitted through a transmitted light waveguide section of a waveguide is split between two separate waveguides, a first separate waveguide and a second separate waveguide, by a power splitter. A power splitter in the context of the present disclosure comprises for example one or more multi-mode interferometers or one or more directional couplers.

The outputs of the first separate waveguide of a first waveguide and of the second separate waveguide of a second waveguide subsequent to the first waveguide in the array of waveguides are combined by a power combiner. A power combiner in the context of the present disclosure for example comprises one or more multi-mode interferometers or one or more directional couplers. The output power of the combined outputs of the first separate waveguide of a first waveguide and of the second separate waveguide of a second waveguide subsequent to the first waveguide in the array of waveguides is then a measure for the phase difference between the first waveguide and the second waveguide.

Calculating the actual phase difference can be challenging, because the phase difference $\Delta\phi$ and $2\pi-\Delta\phi$ give the same output intensity. By varying the optical path length of one of the neighboring waveguides of the array, i.e. either the optical path length of the first waveguide or the optical path length of the second waveguide, it is possible to uniquely determine what the output phase is, given that an initial light intensity $I_0$ is known from a measurement at the output of an outer waveguide of the array of waveguides. A possible non-uniformity of the output power across the different waveguides in the array of waveguides can be determined for example from simulations. A zero-phase error will be achieved for maximum intensity.

As visible on FIG. 3 of the present disclosure, when considering the second power combiner 330 from the bottom of the array of waveguides, the following intensity (3) can be determined the output of the power combiner 330:

$$I = \frac{I_0}{2}\cos^2\left(\frac{\Delta\phi}{2}\right) \qquad (3)$$

wherein the intensity $I_0$ corresponds to the intensity of the light at the output of the first separate waveguide 321 of for example an outer waveguide 310 on FIG. 3.

According to example embodiments, the power combiner comprises one of the following:

a 2×1 multi-mode interferometer;

a 2×2 multi-mode interferometer;

a 2×3 multi-mode interferometer;

a 2×4 multi-mode interferometer.

In some example embodiments, the power combiner comprises a 2×3 multi-mode interferometer.

As visible on FIG. 4 of the present disclosure, when considering the second power combiner 330 from the bottom of the array of waveguides, which is a 2×4 multi-mode interferometer, the following intensity (4) can be determined the first output of the power combiner 330 from the bottom:

$$I = \frac{I_0}{2}\sin^2\left(\frac{\Delta\phi}{2}\right) \qquad (4)$$

The following intensity ( ) can be determined the second output of the power combiner 330 from the bottom:

$$I = \frac{I_0}{2}\sin^2\left(\frac{\Delta\phi}{2} + \frac{\pi}{4}\right) \qquad (5)$$

The following intensity (6) can be determined the third output of the power combiner 330 from the bottom:

$$I = \frac{I_0}{2}\cos^2\left(\frac{\Delta\phi}{2} + \frac{\pi}{4}\right) \qquad (6)$$

The following intensity (7) can be determined the fourth output of the power combiner 330 from the bottom:

$$I = \frac{I_0}{2}\cos^2\left(\frac{\Delta\phi}{2}\right) \qquad (7)$$

Three of these four outputs are sufficient to get a correct absolute phase error. The order of the different displayed functions $I(\Delta\phi)$ will depend on where the inputs of the 2×4 MMI are positioned. The intensity $I_0$ corresponds to the light inside a waveguide of the waveguide array, such as for example an outer waveguide 310 on FIG. 4. Note that by measuring three of these four outputs one can determine the intensity $I_0$, and the phase difference between neighboring waveguides, unambiguously up to a phase difference of 360°. By summing the two outputs that are 180° out of phase, one can determine $I_0$. The third output allows to unambiguously determine the phase. Note that it may be sufficient to determine the intensity of the light incident into the AWG only once. In that case it suffices to measure two light signals that are 90° or −90° out of phase, hereby limiting the number of detectors required.

According to example embodiments, each coupler comprises one or more directional couplers configured to combine light propagating in the two transmitted light waveguide sections of a pair of consecutive waveguides in the array.

It may be beneficial to replace the power combiner by a coupler, for example a 2×4 coupler, to determine $I_0$ and $\Delta\phi$ accurately. In other words, the same optical functionality may be achieved with directional couplers instead of power combiners as understood above. One or more photodetectors could be used to measure the phase shift between neighboring waveguides in the array of waveguides.

According to example embodiments, each coupler further comprises one or more photodetectors configured to determine the optical phase difference between the two consecutive waveguides.

In the context of the present disclosure, a photodetector can be on-chip with the integrated photonics arrayed waveguide multiplexing/demultiplexing device. Alternatively, a photodetector can be off-chip with respect to the integrated photonics arrayed waveguide multiplexing/demultiplexing device. The one or more photodetectors may be formed or coupled after the couplers. Alternatively, the waveguides of the array of waveguides may be routed to another position on the chip onto which the integrated photonics arrayed waveguide multiplexing/demultiplexing device is formed, and the one or more photodetectors may then be formed or coupled at this other position. Alternatively, light coming out of the waveguides of the array of waveguides may be scattered towards one or more photodetectors in a plane different from the plane in which the integrated photonics arrayed waveguide multiplexing/demultiplexing device is formed.

According to example embodiments, an outer waveguide in the array has a first length, and wherein each $i^{th}$ consecutive waveguide has a length equal to the sum of the first length and $\Delta L_i$, wherein $\Delta L_i$ is the optical path length difference between the outer waveguide and the $i^{th}$ consecutive waveguide.

Preferably, an outer waveguide of the array of waveguides corresponds to the waveguide with the shortest length $L_0$. The length of the shortest waveguide of the array of waveguides can be chosen freely, although some minimal length may be needed to align the different tunable reflectors or to implement the phase correcting regions. In practice, the length of the shortest waveguide of the array of waveguides is preferably kept as short as possible to minimize phase errors as much as possible. Advantageously, the following longer waveguides in the array of waveguides have a length $L_0 + i \cdot \Delta L$, for the $i^{th}$ neighbor, wherein $i \cdot \Delta L$ is the optical path length difference between the outer waveguide and the $i^{th}$ consecutive waveguide. Note that after adding a path length of $\Delta L$ to the shortest of the two neighbouring waveguides, the phase difference between consecutive waveguides in the array of waveguides is error free when the light exiting both waveguides are in-phase.

According to example embodiments, the coupler of the outer waveguide or a last consecutive waveguide in the array is further configured to determine an intensity of light propagating in the transmitted light waveguide section of the respective outer waveguide or the last consecutive waveguide.

This way, an initial light intensity $I_0$ can be determined from a measurement at the output of an outer waveguide of the array of waveguides.

According to example embodiments, the tunable reflector is a Bragg reflector.

According to example embodiments, the free propagation region is a slab waveguide or a star coupler.

According to example embodiments, the phase correcting region comprises one or more of the following:
a phase shifter;
a capacitive phase shifter
one or more phase change materials;
a heater;
a waveguide section with a memory element;
a ferroelectric material;
a doped waveguide section;
a waveguide section to be trimmed with ions;
a waveguide section which can be annealed.

According to example embodiments, the one or more phase change materials are chosen from the group of GST, GSST, MoO, SbS, SbSe.

Phase change materials may be used for phase correction since these allow to preserve a certain set condition in time. Phase change materials such as for example GST, also referred to as GeSbTe or germanium-antimony-tellurium, GSST, also referred to as Ge—Sb—Se—Te, MoO, are materials which have two, or several, stable phases, the amorphous and crystalline phase. The optical material properties are significantly different in these different structural phases. By placing such a material in the optical extent of a waveguide of the array of waveguides one can change the effective optical path length of the respective waveguide. For example, annealing a patch of GSST will therefore increase the phase shift according to the equation (8):

$$\Delta\phi = (n_{\mathit{eff},\mathit{after\ anneal}} - n_{\mathit{eff},\mathit{before\ anneal}}) \cdot k_0 \cdot L_{GSST} \qquad (8)$$

where $n_{\mathit{eff},x}$ is the effective mode index of the waveguide mode before and after annealing the phase change material, T is the temperature, $k_0$ wavevector of light in vacuum, $L_{GSST}$ the length over which the phase change material, e.g. GSST, is deposited in the vicinity of the waveguide. A similar effect can be obtained with any material that significantly changes its optical properties upon annealing.

According to example embodiments, each coupler further comprises a grating coupler.

According to example embodiments, the integrated photonics arrayed waveguide multiplexing/demultiplexing device is a spectrometer.

According to a second example aspect of the present disclosure, there is provided a method for correcting differences in optical path length in an integrated photonics arrayed waveguide multiplexing/demultiplexing device, the method comprising the steps of:
providing a free propagation region comprising a first section and a second section;
providing a first waveguide coupled to the first section;
providing a plurality of output waveguides coupled to the first section;
providing an array of waveguides with increasing lengths between consecutive waveguides throughout the array and coupled to the second section, wherein each waveguide comprises:
an incident light waveguide section comprising a phase correcting region;
a transmitted light waveguide section;
a tunable reflector between the incident light waveguide section and the transmitted light waveguide section; wherein the tunable reflector is configured to act as a semi-transparent reflector for light propagating between the incident light waveguide section and the transmitted light waveguide section, thereby generating reflected light;
collecting the reflected light at least partially in the output waveguides;
for each pair of consecutive waveguides in the array:
combining light propagating in the transmitted light waveguide sections of the two consecutive waveguides;
determining therefrom an optical phase difference between the two consecutive waveguides; and
determining therefrom a change in optical path length required for each of two consecutive waveguides in the array to reach a predetermined optical phase difference between the two consecutive waveguides; and
applying the change in each phase correcting region, thereby correcting the optical path length of the respective waveguide.

With the method for correcting differences in optical path length in an integrated photonics arrayed waveguide multiplexing/demultiplexing device according to the present disclosure, a tunable reflector is formed in each waveguide of the waveguide array. Each tunable reflector is for example a semi-transparent reflector which acts as a semi-transparent reflector for light propagating between the incident light waveguide section and the transmitted light waveguide section, thereby generating reflected light. The reflected light propagates back towards the free propagation region and the reflected light couples at least partially back to one or more of the output waveguides coupled to the first section of the free propagation region. With the method for correcting differences in optical path length in an integrated photonics arrayed waveguide multiplexing/demultiplexing device according to the present disclosure, the fraction of the light which is transmitted to the transmitted light waveguide section of a waveguide through the tunable reflector can be used to evaluate the magnitude of the phase errors between each subsequent waveguide of the array of waveguides. In other words, an amplitude of the phase errors between two consecutive waveguides of the array of waveguides can be determined from light which is transmitted to the transmitted light waveguide sections of the two consecutive waveguides through the respective tunable reflectors. This is realized according to the present disclosure by interfering substantially half of the power of the light transmitted to the transmitted light waveguide section of a first waveguide of the array of waveguides with half of the power of the light transmitted to the transmitted light waveguide section of a waveguide neighboring the first waveguide in the array of waveguides.

With the method for correcting differences in optical path length in an integrated photonics arrayed waveguide multiplexing/demultiplexing device according to the present disclosure, knowing the actual phase errors between the waveguides of the array of waveguides allows correcting the phase errors with the phase correcting region. For example, the correction of the phase errors can happen either actively with for example phase shifters, or permanently by changing one or more geometrical and design aspects of the waveguide array.

According to a third example embodiment, a computer program product comprising computer-executable instructions for causing a system to perform at least the following is provided:
providing a free propagation region comprising a first section and a second section;

providing a first waveguide coupled to the first section;

providing a plurality of output waveguides coupled to the first section;

providing an array of waveguides with increasing lengths between consecutive waveguides throughout the array and coupled to the second section, wherein each waveguide comprises:

an incident light waveguide section comprising a phase correcting region;

a transmitted light waveguide section;

a tunable reflector between the incident light waveguide section and the transmitted light waveguide section; wherein the tunable reflector is configured to act as a semi-transparent reflector for light propagating between the incident light waveguide section and the transmitted light waveguide section, thereby generating reflected light;

collecting the reflected light at least partially in the output waveguides;

for each pair of consecutive waveguides in the array:

combining light propagating in the transmitted light waveguide sections of the two consecutive waveguides;

determining therefrom an optical phase difference between the two consecutive waveguides; and determining therefrom a change in optical path length required for each of two consecutive waveguides in the array to reach a predetermined optical phase difference between the two consecutive waveguides; and applying the change in each phase correcting region, thereby correcting the optical path length of the respective waveguide.

According to a fourth example aspect, a computer readable storage medium is provided, wherein the computer readable storage medium comprises computer-executable instructions for performing the following steps when the program is run on a computer:

providing a free propagation region comprising a first section and a second section;

providing a first waveguide coupled to the first section;

providing a plurality of output waveguides coupled to the first section;

providing an array of waveguides with increasing lengths between consecutive waveguides throughout the array and coupled to the second section, wherein each waveguide comprises:

an incident light waveguide section comprising a phase correcting region;

a transmitted light waveguide section;

a tunable reflector between the incident light waveguide section and the transmitted light waveguide section; wherein the tunable reflector is configured to act as a semi-transparent reflector for light propagating between the incident light waveguide section and the transmitted light waveguide section, thereby generating reflected light;

collecting the reflected light at least partially in the output waveguides;

for each pair of consecutive waveguides in the array:

combining light propagating in the transmitted light waveguide sections of the two consecutive waveguides;

determining therefrom an optical phase difference between the two consecutive waveguides; and determining therefrom a change in optical path length required for each of two consecutive waveguides in the array to reach a predetermined optical phase difference between the two consecutive waveguides; and applying the change in each phase correcting region, thereby correcting the optical path length of the respective waveguide.

BRIEF DESCRIPTION OF THE DRAWINGS

Some example embodiments will now be described with reference to the accompanying drawings.

DETAILED DESCRIPTION

Figure 1:
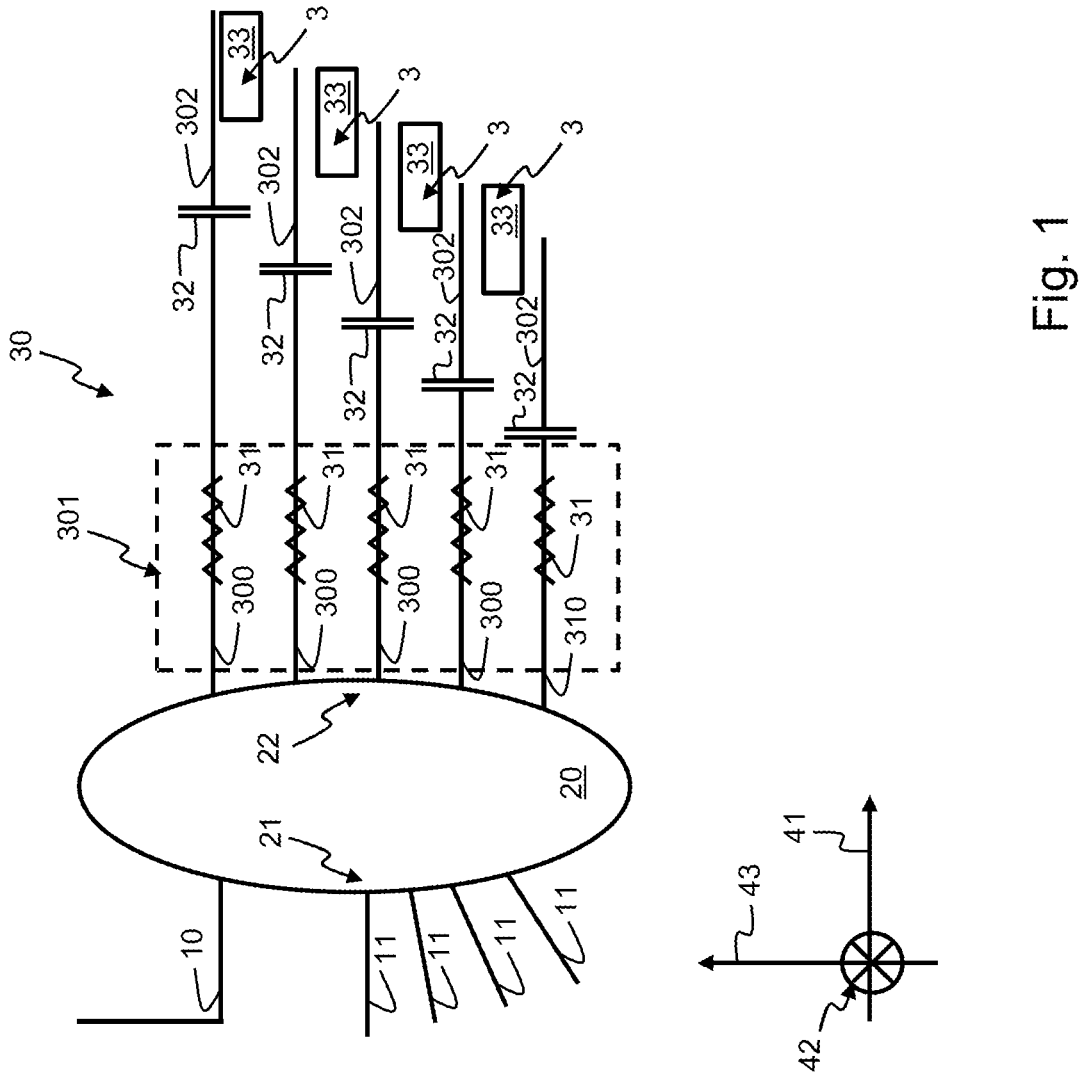
FIG. 1 depicts an example embodiment of an integrated photonics arrayed waveguide multiplexing/demultiplexing device according to the present disclosure.

FIG. 1 illustrates an example embodiment of an integrated photonics arrayed waveguide multiplexing/demultiplexing device 1 according to the present disclosure. The integrated photonics arrayed waveguide multiplexing/demultiplexing device 1 according to the present disclosure extends along the longitudinal direction 41 and the traverse direction 42, while the direction 43 is traverse to both the longitudinal direction 41 and the traverse direction 42. The integrated photonics arrayed waveguide multiplexing/demultiplexing device 1 comprises a free propagation region 20 comprising a first section 21 and a distinct second section 22. The integrated photonics arrayed waveguide multiplexing/demultiplexing device 1 further comprises a first waveguide 10 coupled to the first section 21 and a plurality of output waveguides 11 coupled to the first section 21. The integrated photonics arrayed waveguide multiplexing/demultiplexing device 1 further comprises an array 30 of waveguides 300 with increasing lengths between consecutive waveguides 300 throughout the array 30 and coupled to the second section 22. Each waveguide 300 comprises an incident light waveguide section 301, a transmitted light waveguide section 302, and a tunable reflector 32 between the incident light waveguide section 301 and the transmitted light waveguide section 302. The incident light waveguide section 301 comprises a phase correcting region 31. The tunable reflector 32 is configured to act as a semi-transparent reflector for light propagating between the incident light waveguide section 301 and the transmitted light waveguide section 302 of each waveguide 300, thereby generating reflected light. The output waveguides 11 are configured to collect the reflected light at least partially once it has propagated back to the free propagation region 20 and the output waveguides 11. An outer waveguide 310 in the array 30 has a first length and each consecutive waveguide 300 in the array has a length equal to the sum of the length of the outer waveguide 310 and $i \cdot \Delta L$ wherein $i \cdot \Delta L$ is the optical path length between the outer waveguide 310 and the $i^{th}$ consecutive waveguide 300. Each pair of consecutive waveguides 300 in the array 30 comprises a coupler 33 configured to combine light propagating in the transmitted light waveguide sections 302 of the two consecutive waveguides 300. Each coupler 33 is further configured to determine therefrom an optical phase difference between the two consecutive waveguides 300. The couplers 33 are further configured to determine therefrom a change 3 in optical path length required for each of two consecutive waveguides 300 in the array 30 to reach a predetermined optical phase difference between the two consecutive waveguides 300. Each phase correcting region 31 is configured to apply the change 3 to correct the optical path length of the respective waveguide 300. The coupler 33 of the outer waveguide 310 in the array 30 is further configured to determine an intensity of light propagating in the transmitted light waveguide section 302 of the output waveguide 310.

Figure 2:
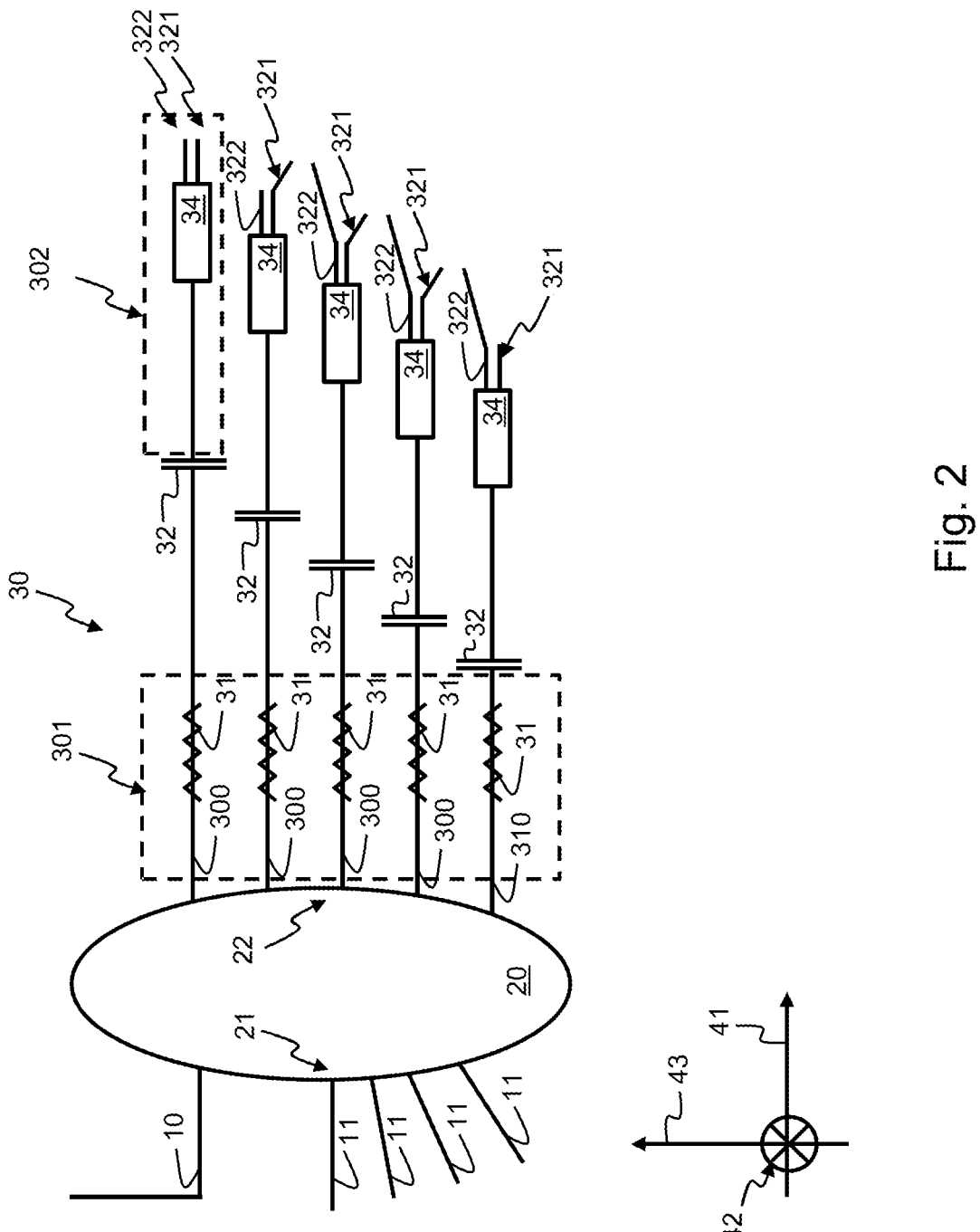
FIG. 2 depicts an example embodiment of an integrated photonics arrayed waveguide multiplexing/demultiplexing device according to the present disclosure.

FIG. 2 illustrates an example embodiment of an integrated photonics arrayed waveguide multiplexing/demultiplexing device 1 according to the present disclosure. Components having identical reference numbers than on FIG. 1 fulfill the same functions. The integrated photonics arrayed waveguide multiplexing/demultiplexing device 1 comprises a free propagation region 20 comprising a first section 21 and a second section 22. The integrated photonics arrayed waveguide multiplexing/demultiplexing device 1 further comprises a first waveguide 10 coupled to the first section 21 and a plurality of output waveguides 11 coupled to the first section 21. The integrated photonics arrayed waveguide multiplexing/demultiplexing device 1 further comprises an array 30 of waveguides 300 with increasing lengths between consecutive waveguides 300 throughout the array 30 and coupled to the second section 22. Each waveguide 300 comprises an incident light waveguide section 301, a transmitted light waveguide section 302, and a tunable reflector 32 between the incident light waveguide section 301 and the transmitted light waveguide section 302. The incident light waveguide section 301 comprises a phase correcting region 31. The tunable reflector 32 is configured to act as a semi-transparent reflector for light propagating between the incident light waveguide section 301 and the transmitted light waveguide section 302 of each waveguide 300, thereby generating reflected light. The output waveguides 11 are configured to collect the reflected light at least partially once it has propagated back to the free propagation region 20 and the output waveguides 11. An outer waveguide 310 in the array 30 has a first length and each consecutive waveguide 300 in the array has a length equal to the sum of the length of the outer waveguide 310 and $i \cdot \Delta L$ wherein $i \cdot \Delta L$ is the optical path length between the outer waveguide 310 and the $i^{th}$ consecutive waveguide 300. Each pair of consecutive waveguides 300 in the array 30 comprises a power splitter 34 configured to split the respective transmitted light waveguide sections 302 into two separate waveguides 321; 322, a first separate waveguide 321 and a second separate waveguide 322. Each pair of consecutive waveguides 300 in the array 30 comprises a coupler (not shown in FIG. 2) configured to combine light propagating in the transmitted light waveguide sections 302 of the two consecutive waveguides 300. Each coupler is further configured to determine therefrom an optical phase difference between the two consecutive waveguides 300. The couplers are further configured to determine therefrom a change in optical path length required for each of two consecutive waveguides 300 in the array 30 to reach a predetermined optical phase difference between the two consecutive waveguides 300. Each phase correcting region 31 is configured to apply the change to correct the optical path length of the respective waveguide 300. The coupler of the outer waveguide 310 in the array 30 is further configured to determine an intensity of light propagating in the transmitted light waveguide section 302 of the output waveguide 310.

Figure 3:
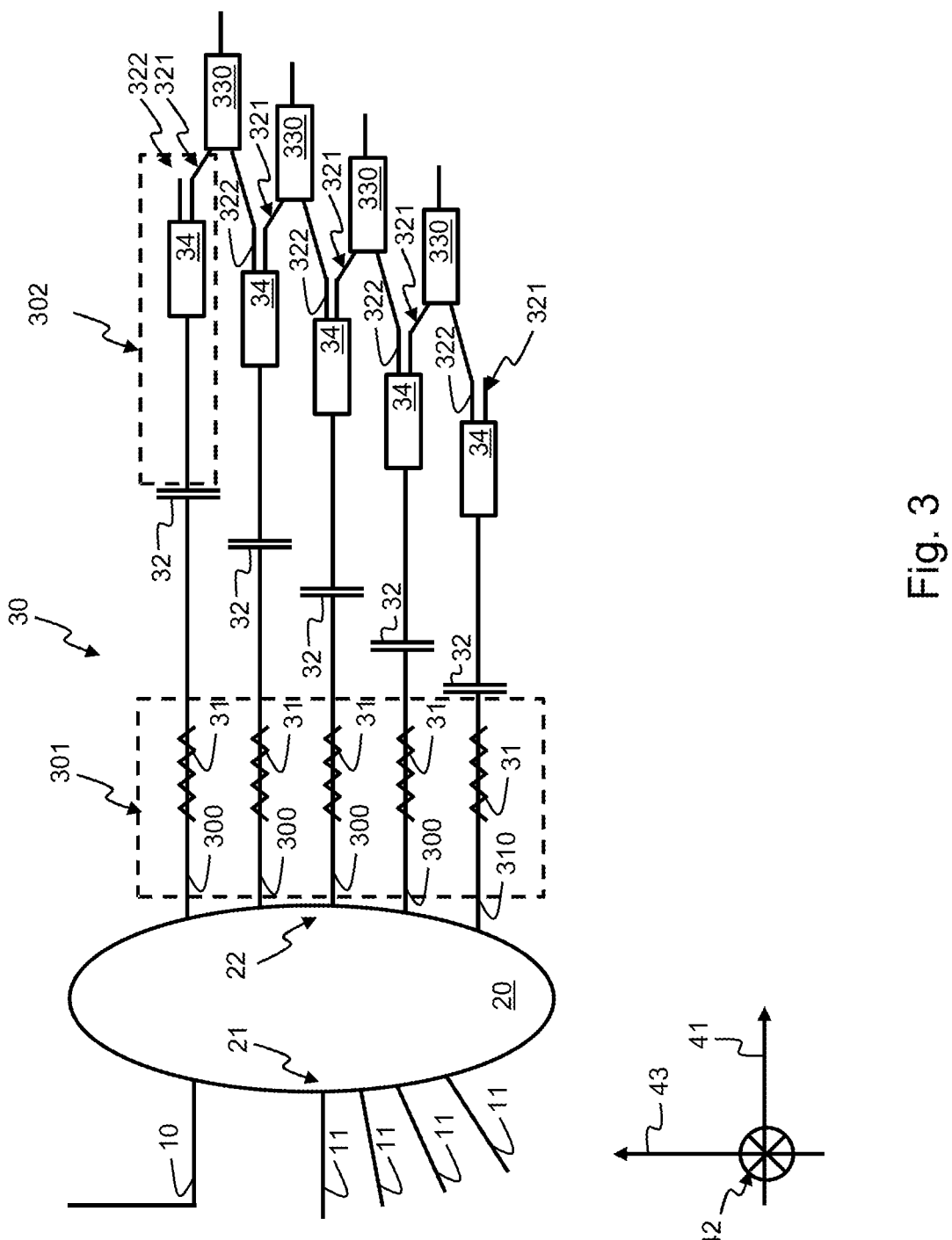
FIG. 3 depicts an example embodiment of an integrated photonics arrayed waveguide multiplexing/demultiplexing device according to the present disclosure.

FIG. 3 illustrates an example embodiment of an integrated photonics arrayed waveguide multiplexing/demultiplexing device 1 according to the present disclosure. Components having identical reference numbers than on FIG. 1 or FIG. 2 fulfill the same functions. The integrated photonics arrayed waveguide multiplexing/demultiplexing device 1 comprises a free propagation region 20 comprising a first section 21 and a second section 22. The integrated photonics arrayed waveguide multiplexing/demultiplexing device 1 further comprises a first waveguide 10 coupled to the first section 21 and a plurality of output waveguides 11 coupled to the first section 21. The integrated photonics arrayed waveguide multiplexing/demultiplexing device 1 further comprises an array 30 of waveguides 300 with increasing lengths between consecutive waveguides 300 throughout the array 30 and coupled to the second section 22. Each waveguide 300 comprises an incident light waveguide section 301, a transmitted light waveguide section 302, and a tunable reflector 32 between the incident light waveguide section 301 and the transmitted light waveguide section 302. The incident light waveguide section 301 comprises a phase correcting region 31. The tunable reflector 32 is configured to act as a semi-transparent reflector for light propagating between the incident light waveguide section 301 and the transmitted light waveguide section 302 of each waveguide 300, thereby generating reflected light. The output waveguides 11 are configured to collect the reflected light at least partially once it has propagated back to the free propagation region 20 and the output waveguides 11. An outer waveguide 310 in the array 30 has a first length and each consecutive waveguide 300 in the array has a length equal to the sum of the length of the outer waveguide 310 and $i \cdot \Delta L$ wherein $i \cdot \Delta L$ is the optical path length between the outer waveguide 310 and the $i^{th}$ consecutive waveguide 300. Each pair of consecutive waveguides 300 in the array 30 comprises a power splitter 34 configured to split the respective transmitted light waveguide sections 302 into two separate waveguides 321; 322, a first separate waveguide 321 and a second separate waveguide 322. Each pair of consecutive waveguides 300 in the array 30 comprises a coupler (not shown in FIG. 3) configured to combine light propagating in the transmitted light waveguide sections 302 of the two consecutive waveguides 300. Each coupler comprises a power combiner 330 configured to combine light propagating in the first separate waveguide 321 of one waveguide of a pair of consecutive waveguides 300 in the array with light propagating in a second separate waveguide 322 of the other waveguide 300 of the pair of consecutive waveguides 300 in the array 30. The coupler is further configured to determine therefrom an optical phase difference between the two consecutive waveguides 300. The couplers are further configured to determine therefrom a change in optical path length required for each of two consecutive waveguides 300 in the array 30 to reach a predetermined optical phase difference between the two consecutive waveguides 300. Each phase correcting region 31 is configured to apply the change to correct the optical path length of the respective waveguide 300. The coupler of the outer waveguide 310 in the array 30 is further configured to determine an intensity of light propagating in the transmitted light waveguide section 302 of the output waveguide 310.

Figure 4:
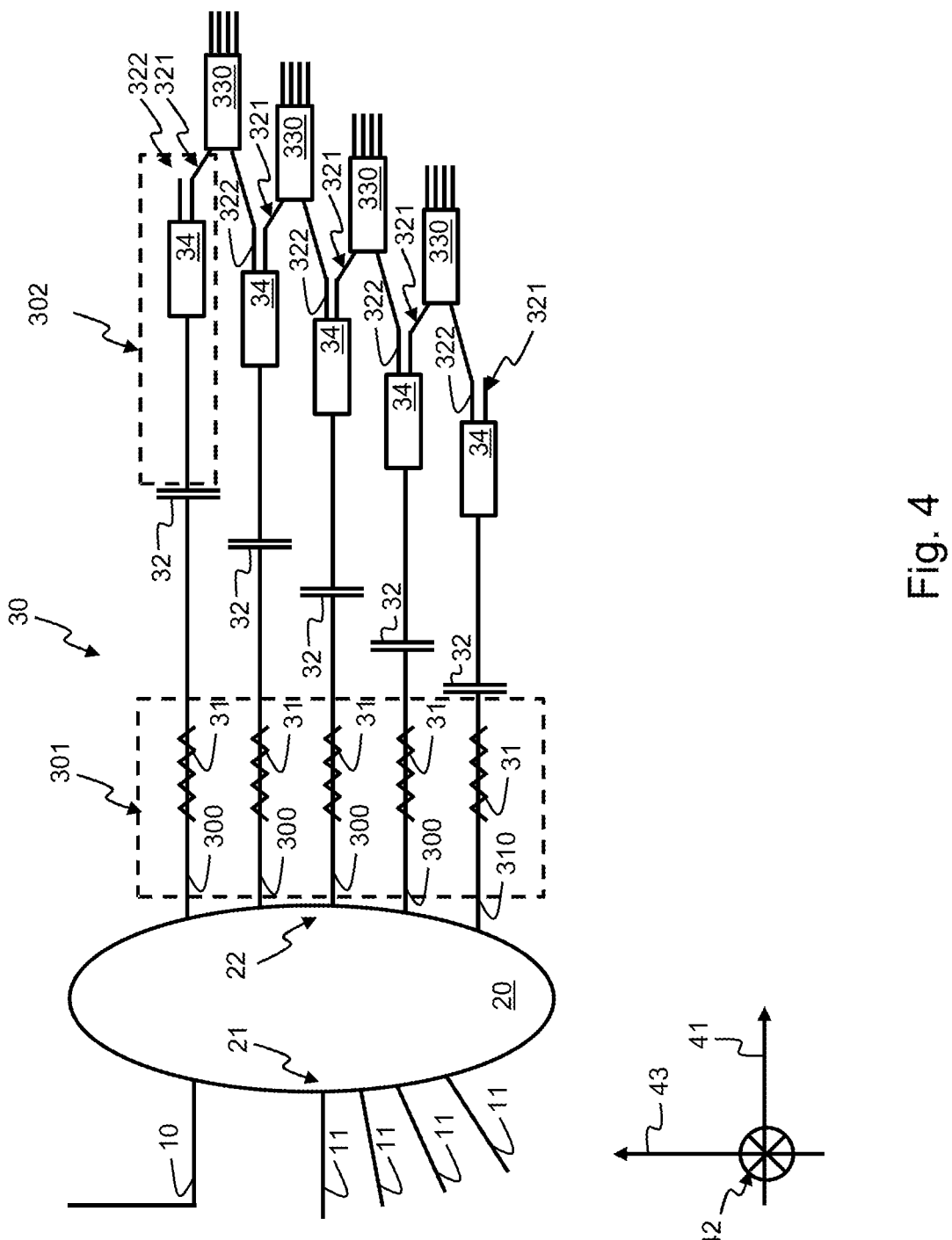
FIG. 4 depicts an example embodiment of an integrated photonics arrayed waveguide multiplexing/demultiplexing device according to the present disclosure.

FIG. 4 illustrates an example embodiment of an integrated photonics arrayed waveguide multiplexing/demultiplexing device 1 according to the present disclosure. Components having identical reference numbers than on FIG. 1, or FIG. 2, or FIG. 3 fulfill the same functions. The integrated photonics arrayed waveguide multiplexing/demultiplexing device 1 comprises a free propagation region 20 comprising a first section 21 and a second section 22. The integrated photonics arrayed waveguide multiplexing/demultiplexing device 1 further comprises a first waveguide 10 coupled to the first section 21 and a plurality of output waveguides 11 coupled to the first section 21. The integrated photonics arrayed waveguide multiplexing/demultiplexing device 1 further comprises an array 30 of waveguides 300 with increasing lengths between consecutive waveguides 300 throughout the array 30 and coupled to the second section 22. Each waveguide 300 comprises an incident light waveguide section 301, a transmitted light waveguide section 302, and a tunable reflector 32 between the incident light waveguide section 301 and the transmitted light waveguide section 302. The incident light waveguide section 301 comprises a phase correcting region 31. The tunable reflector 32 is configured to act as a semi-transparent reflector for light propagating between the incident light waveguide section 301 and the transmitted light waveguide section 302 of each waveguide 300, thereby generating reflected light. The output waveguides 11 are configured to collect the reflected light at least partially once it has propagated back to the free propagation region 20 and the output waveguides 11. An outer waveguide 310 in the array 30 has a first length and each consecutive waveguide 300 in the array has a length equal to the sum of the length of the outer waveguide 310 and $i \cdot \Delta L$ wherein $i \cdot \Delta L$ is the optical path length between the outer waveguide 310 and the $i^{th}$ consecutive waveguide 300. Each pair of consecutive waveguides 300 in the array 30 comprises a power splitter 34 configured to split the respective transmitted light waveguide sections 302 into two separate waveguides 321; 322, a first separate waveguide 321 and a second separate waveguide 322. Each pair of consecutive waveguides 300 in the array 30 comprises a coupler (not shown in FIG. 4) configured to combine light propagating in the transmitted light waveguide sections 302 of the two consecutive waveguides 300. Each coupler comprises a power combiner 330 configured to combine light propagating in the first separate waveguide 321 of one waveguide of a pair of consecutive waveguides 300 in the array with light propagating in a second separate waveguide 322 of the other waveguide 300 of the pair of consecutive waveguides 300 in the array 30. The coupler is further configured to determine therefrom an optical phase difference between the two consecutive waveguides 300. The couplers are further configured to determine therefrom a change in optical path length required for each of two consecutive waveguides 300 in the array 30 to reach a predetermined optical phase difference between the two consecutive waveguides 300. Each phase correcting region 31 is configured to apply the change to correct the optical path length of the respective waveguide 300. The power combiner 330 comprises one or more of the following: a 2×n multi-mode interferometer, wherein n is equal to 2, 3, 4, etc. The coupler of the outer waveguide 310 in the array 30 is further configured to determine an intensity of light propagating in the transmitted light waveguide section 302 of the output waveguide 310. Alternatively, the coupler of the last consecutive and thus longest waveguide 300 in the array 30 may be configured to determine an intensity of light propagating in the transmitted light waveguide section 302 of the output waveguide 300.

Figure 5:
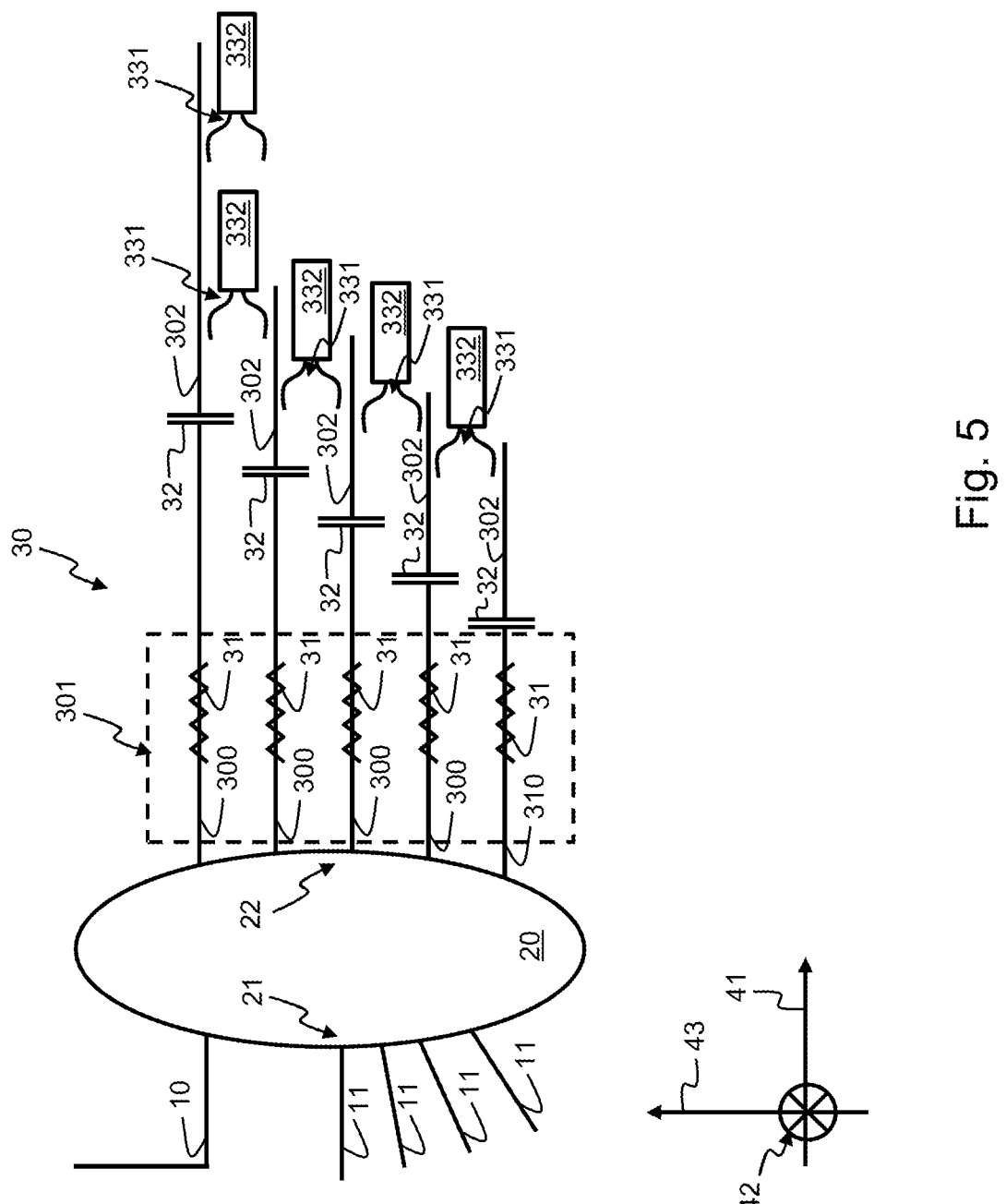
FIG. 5 depicts an example embodiment of an integrated photonics arrayed waveguide multiplexing/demultiplexing device according to the present disclosure.

FIG. 5 illustrates an example embodiment of an integrated photonics arrayed waveguide multiplexing/demultiplexing device 1 according to the present disclosure. Components having identical reference numbers than on FIG. 1, or FIG. 2, or FIG. 3, or FIG. 4 fulfill the same functions. The integrated photonics arrayed waveguide multiplexing/demultiplexing device 1 comprises a free propagation region 20 comprising a first section 21 and a second section 22. The integrated photonics arrayed waveguide multiplexing/demultiplexing device 1 further comprises a first waveguide 10 coupled to the first section 21 and a plurality of output waveguides 11 coupled to the first section 21. The integrated photonics arrayed waveguide multiplexing/demultiplexing device 1 further comprises an array 30 of waveguides 300 with increasing lengths between consecutive waveguides 300 throughout the array 30 and coupled to the second section 22. Each waveguide 300 comprises an incident light waveguide section 301, a transmitted light waveguide section 302, and a tunable reflector 32 between the incident light waveguide section 301 and the transmitted light waveguide section 302. The incident light waveguide section 301 comprises a phase correcting region 31. The tunable reflector 32 is configured to act as a semi-transparent reflector for light propagating between the incident light waveguide section 301 and the transmitted light waveguide section 302 of each waveguide 300, thereby generating reflected light. The output waveguides 11 are configured to collect the reflected light at least partially once it has propagated back to the free propagation region 20 and the output waveguides 11. An outer waveguide 310 in the array 30 has a first length and each consecutive waveguide 300 in the array has a length equal to the sum of the length of the outer waveguide 310 and $i \cdot \Delta L$ wherein $i \cdot \Delta L$ is the optical path length between the outer waveguide 310 and the $i^{th}$ consecutive waveguide 300. Each pair of consecutive waveguides 300 in the array 30 comprises a coupler (not shown in FIG. 5) configured to combine light propagating in the transmitted light waveguide sections 302 of the two consecutive waveguides 300. Each coupler is further configured to determine therefrom an optical phase difference between the two consecutive waveguides 300. The couplers are further configured to determine therefrom a change in optical path length required for each of two consecutive waveguides 300 in the array 30 to reach a predetermined optical phase difference between the two consecutive waveguides 300. Each phase correcting region 31 is configured to apply the change to correct the optical path length of the respective waveguide 300. Each coupler comprises one or more directional couplers 331 configured to combine light propagating in the two transmitted light waveguide sections 302 of a pair of consecutive waveguides 300 in the array 30. Each coupler further comprises one or more photodetectors 332 configured to determine the optical phase difference between the two consecutive waveguides 300. The coupler of the outer waveguide 310 in the array 30 is further configured to determine an intensity of light propagating in the transmitted light waveguide section 302 of the output waveguide 310.

Figure 6:
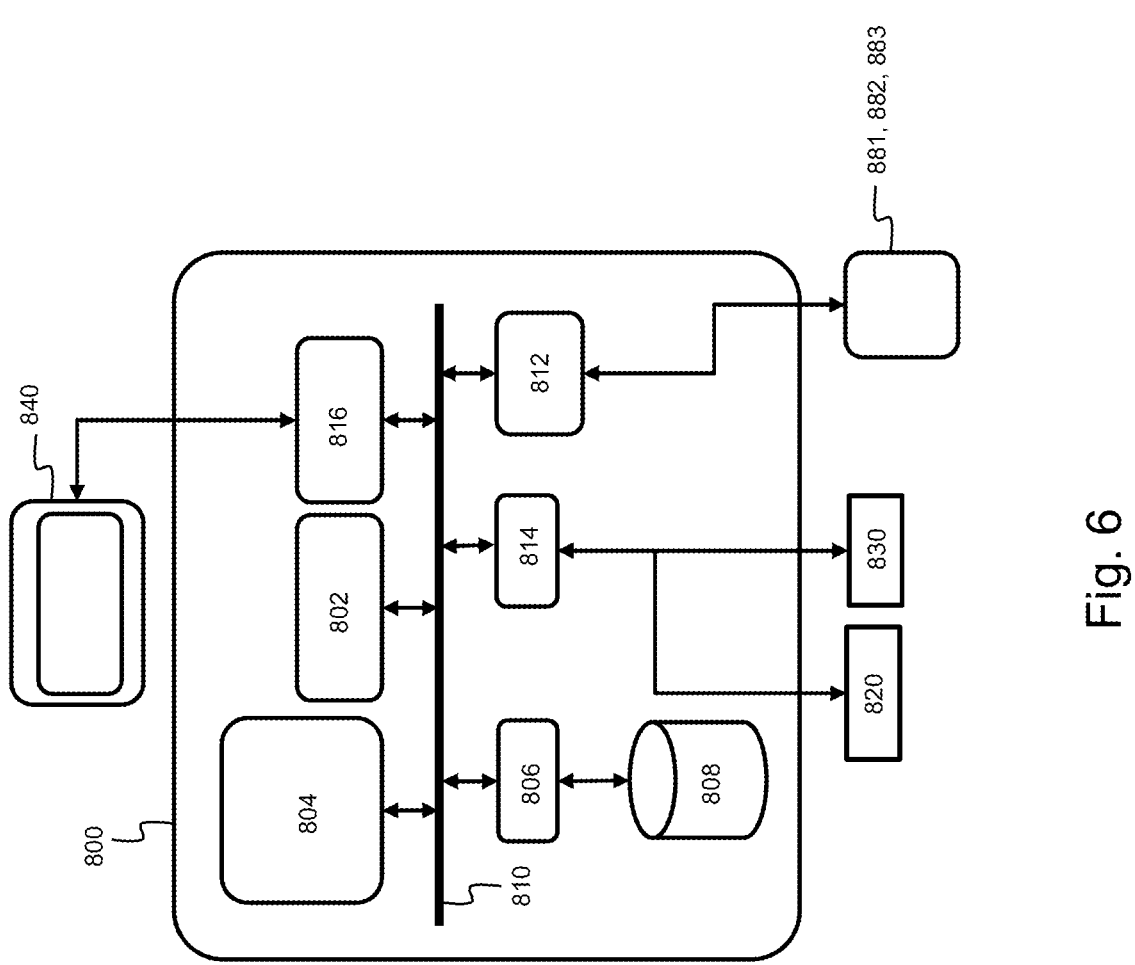
FIG. 6 shows an example embodiment of a suitable computing system for performing one or several steps in the disclosed embodiments.

FIG. 6 shows a suitable computing system 800 enabling to implement embodiments of the system. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or micro-processor that interprets and executes programming instruc-tions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communi-cation interface 812 may comprise any transceiver-like mechanism such as for example one or more Ethernet interfaces that enables computing system 800 to communi-cate with other devices and/or systems, for example with other computing devices 881, 882, 883. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage element(s) 808 above is/are described as a local disk, in general any other suitable computer-readable media such as a removable magnetic disk, optical storage media such as a CD or DVD, -ROM disk, solid state drives, and flash memory cards could be used. Computing system 800 could thus host a computer program for performing the steps of the method according to claim 15.

As used in this application, the term "circuitry" may refer to one or more or all of the following:

(a) hardware-only circuit implementations such as imple-mentations in only analog and/or digital circuitry and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an appara-tus, such as a mobile phone or server, to perform various functions) and
(c) hardware circuit(s) and/or processor(s), such as micro-processor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be con-sidered in all respects as illustrative and not restrictive, the scope of the disclosure being indicated by the appended claims rather than by the foregoing description, and all changes which come within the scope of the claims are therefore intended to be embraced therein.

It will furthermore be understood by the reader of this patent application that the words "comprising" or "com-prise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "C", and the like, when used in the description or in the claims are introduced to distinguish between similar elements or steps and are not necessarily describing a sequential or chrono-logical order. Similarly, the terms "top", "bottom", "over", "under", and the like are introduced for descriptive purposes and not necessarily to denote relative positions. It is to be understood that the terms so used are interchangeable under appropriate circumstances and embodiments of the inven-tion are capable of operating according to the present disclosure in other sequences, or in orientations different from the one(s) described or illustrated above.

What is claimed is:

1. An integrated photonics arrayed waveguide multiplex-ing/demultiplexing device comprising:
a free propagation region comprising a first section and a second section;
a first waveguide coupled to the first section;
a plurality of output waveguides coupled to the first section;
an array of waveguides with increasing lengths between consecutive waveguides throughout the array and coupled to the second section, wherein each waveguide comprises:
an incident light waveguide section comprising a phase correcting region;
a transmitted light waveguide section;
a tunable reflector between the incident light wave-guide section and the transmitted light waveguide section; wherein the tunable reflector is configured to act as a semi-transparent reflector for light propagat-ing between the incident light waveguide section and the transmitted light waveguide section, thereby gen-erating reflected light;
wherein the output waveguides are configured to collect the reflected light at least partially;
wherein each pair of consecutive waveguides in the array comprises a coupler configured to:
combine light propagating in the transmitted light waveguide sections of the two consecutive wave-guides;
determine therefrom an optical phase difference between the two consecutive waveguides; and wherein the couplers are further configured to determine therefrom a change in optical path length required for each of two consecutive waveguides in the array to reach a predetermined optical phase difference between the two consecutive waveguides;

and wherein each phase correcting region is configured to apply the change to correct the optical path length of the respective waveguide.

2. The integrated photonics arrayed waveguide multiplexing/demultiplexing device according to claim 1, wherein each of the transmitted light waveguide sections further comprises a power splitter configured to split the respective transmitted light waveguide section into two separate waveguides, a first separate waveguide and a second separate waveguide.

3. The integrated photonics arrayed waveguide multiplexing/demultiplexing device according to claim 2, wherein an outer waveguide in the array has a first length, and wherein each $i^{th}$ consecutive waveguide has a length equal to the sum of the first length and $\Delta L_i$, wherein $\Delta L_i$ is the optical path length difference between the outer waveguide and the $i^{th}$ consecutive waveguide.

4. The integrated photonics arrayed waveguide multiplexing/demultiplexing device according to claim 2, wherein each coupler comprises a power combiner configured to combine light propagating in a first separate waveguide of one waveguide of a pair of consecutive waveguides in the array with light propagating in a second separate waveguide of the other waveguide of the pair of consecutive waveguides in the array.

5. The integrated photonics arrayed waveguide multiplexing/demultiplexing device according to claim 4, wherein the power combiner comprises one of the following:

a 2×1 multi-mode interferometer;
a 2×2 multi-mode interferometer;
a 2×3 multi-mode interferometer; and
a 2×4 multi-mode interferometer.

6. The integrated photonics arrayed waveguide multiplexing/demultiplexing device according to claim 5, wherein each coupler further comprises one or more photodetectors configured to determine the optical phase difference between the two consecutive waveguides.

7. The integrated photonics arrayed waveguide multiplexing/demultiplexing device according to claim 4, wherein an outer waveguide in the array has a first length, and wherein each $i^{th}$ consecutive waveguide has a length equal to the sum of the first length and $\Delta L_i$, wherein $\Delta L_i$ is the optical path length difference between the outer waveguide and the $i^{th}$ consecutive waveguide.

8. The integrated photonics arrayed waveguide multiplexing/demultiplexing device according to claim 1, wherein each coupler comprises one or more directional couplers configured to combine light propagating in the two transmitted light waveguide sections of a pair of consecutive waveguides in the array.

9. The integrated photonics arrayed waveguide multiplexing/demultiplexing device according to claim 8, wherein an outer waveguide in the array has a first length, and wherein each $i^{th}$ consecutive waveguide has a length equal to the sum of the first length and $\Delta L_i$, wherein $\Delta L_i$ is the optical path length difference between the outer waveguide and the $i^{th}$ consecutive waveguide.

10. The integrated photonics arrayed waveguide multiplexing/demultiplexing device according to claim 1, wherein an outer waveguide in the array has a first length, and wherein each $i^{th}$ consecutive waveguide has a length equal to the sum of the first length and $\Delta L_i$, wherein $\Delta L_i$ is the optical path length difference between the outer waveguide and the $i^{th}$ consecutive waveguide.

11. The integrated photonics arrayed waveguide multiplexing/demultiplexing device according to claim 10, wherein the coupler of the outer waveguide or a last consecutive waveguide in the array is further configured to determine an intensity of light propagating in the transmitted light waveguide section of the respective outer waveguide or the last consecutive waveguide.

12. The integrated photonics arrayed waveguide multiplexing/demultiplexing device according to claim 1, wherein the tunable reflector is a Bragg reflector.

13. The integrated photonics arrayed waveguide multiplexing/demultiplexing device according to claim 1, wherein the free propagation region is a slab waveguide or a star coupler.

14. The integrated photonics arrayed waveguide multiplexing/demultiplexing device according to claim 1, wherein the phase correcting region comprises one or more of the following:

a phase shifter;
a capacitive phase shifter
one or more phase change materials;
a heater;
a waveguide section with a memory element;
a ferroelectric material;
a doped waveguide section;
a waveguide section to be trimmed with ions;
a waveguide section which can be annealed.

15. The integrated photonics arrayed waveguide multiplexing/demultiplexing device according to claim 14, wherein the one or more phase change materials are chosen from the group of GST, GSST, MoO, SbS, SbSe.

16. The integrated photonics arrayed waveguide multiplexing/demultiplexing device according to claim 1, wherein each coupler further comprises a grating coupler.

17. The integrated photonics arrayed waveguide multiplexing/demultiplexing device according to claim 1, wherein the integrated photonics arrayed waveguide multiplexing/demultiplexing device is a spectrometer.

18. A method for correcting differences in optical path length in an integrated photonics arrayed waveguide multiplexing/demultiplexing device, the method comprising the steps of:

providing a free propagation region comprising a first section and a second section;

providing a first waveguide coupled to the first section;

providing a plurality of output waveguides coupled to the first section;

providing an array of waveguides with increasing lengths between consecutive waveguides throughout the array and coupled to the second section, wherein each waveguide comprises:

an incident light waveguide section comprising a phase correcting region;

a transmitted light waveguide section;

a tunable reflector between the incident light waveguide section and the transmitted light waveguide section; wherein the tunable reflector is configured to act as a semi-transparent reflector for light propagating between the incident light waveguide section and the transmitted light waveguide section, thereby generating reflected light;

collecting the reflected light at least partially in the output waveguides;

for each pair of consecutive waveguides in the array:

combining light propagating in the transmitted light waveguide sections of the two consecutive waveguides;

determining therefrom an optical phase difference between the two consecutive waveguides; and determining therefrom a change in optical path length required for each of two consecutive waveguides in the array to reach a predetermined optical phase difference between the two consecutive waveguides; and applying the change in each phase correcting region, thereby correcting the optical path length of the respective waveguide.

\* \* \* \* \*